United States Patent Office 2,972,602
Patented Feb. 21, 1961

2,972,602

NORCAMPHANE-2,5(AND 2,6)-DICARBOXYLIC ACIDS AND POLYAMIDES THEREOF

John R. Caldwell, Russell Gilkey, and James E. Poe, Kingsport, Tenn., assignors to Eastman Kodak Company, Rochester, N.Y., a corporation of New Jersey No Drawing. Filed June 6, 1958, Ser. No. 740,203

11 Claims. (Cl. 260—78)

This invention relates to the preparation of a new class of resinous linear polyamides, and more particularly to high molecular weight polyamides and copolyamides from certain norcamphanedicarboxylic acids.

It is well known that resinous linear polyamides can be prepared from various organic diamines and dicarboxylic acids or esters thereof. However, not all dicarboxylic acids give high molecular weight polyamides. For example, while monocyclic alicyclic dicarboxylic acids such as hexahydroterephthalic and cyclopentamethylene dicarboxylic acids readily form resinous polyamides, fused alicyclic rings such as represented by norcamphane-2,3-dicarboxylic acid and norcamphane-3,3-dicarboxylic acid cannot be used for the production of resinous polyamides. The norcamphane-2,3-dicarboxylic acid, for example, reacts with diamines to give imides that function as chain terminators and prevent molecular growth. It was surprising to find, therefore, that the isomeric norcamphane-2,5-dicarboxylic and norcamphane-2,6-dicarboxylic acids readily formed high-melting, thermoplastic resinous polyamides and copolyamides with various organic diamines employed for polyamide production without any imide formation, and that the resultant polyamides were excellent materials for the manufacture of fibers, films and molded objects.

It is, accordingly, an object of the invention to provide novel norcamphane-2,5- and 2,6-carboxylic acids and resinous polyamides therefrom that are valuable materials for preparing high-softening, strong, elastic fibers, flexible sheets and films and molded articles. Another object is to provide processes for preparing the intermediate monomeric dicarboxylic acids and derivatives thereof and the polyamides of the invention. Other objects will become apparent hereinafter.

In accordance with the invention, we prepare our new class of resinous polyamides by reacting in equimolar quantities a norcamphane dicarboxylic acid represented by the following general formula:

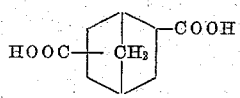

with an organic diamine represented by the general formula:

$$H_2N—R—NH_2$$

wherein R represents a divalent straight chain or branched chain alkylene group of 2-11 carbon atoms e.g. —CH$_2$—, —CH$_2$CH$_2$—, —CH$_2$CH$_2$CH$_2$—, —(CH$_2$)$_{11}$—, etc. groups, a phenylene group, a tolylene group, a cycloalkylene group e.g.

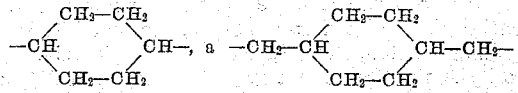

etc. groups,

group, and the like, at 210°–310° C., until a resinous polyamide is formed. Copolyamides may be prepared from a mixture of two or more of the diamines. Another copolyamide modification involves the use of 10–50 mole percent of a second dicarboxylic acid in place of part of the norcamphanedicarboxylic acid. Straight or branched chain aliphatic, alicyclic or aromatic dicarboxylic acids represented by the general formula:

$$HOOC—R_1—COOH$$

wherein $R_1$ represents a divalent alkylene group of 2–10 carbon atoms, a divalent cycloalkylene group and a divalent phenylene group, etc., are suitable modifiers. Especially valuable modifiers are the copolyamides prepared with trans-cyclohexane-1,4-dicarboxylic and terephthalic acids. Thus, the polyamides of the invention consist essentially of the following recurring unit:

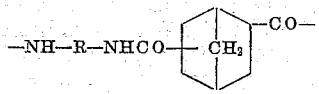

while the copolyamides of the invention consists of a least 50 mole percent, but preferably from 50–90 mole percent of the above recurring unit in linear combination with from 50–10 mole percent of the following recurring unit:

$$—NH—R—NCHO—R_1—CO—$$

wherein in the above units R and $R_1$ are as previously defined.

Advantageously, the reaction may be carried out in an inert medium such as water, cresol, xylenol, etc. The polyamide products are isolated from the reaction mixture by various means such as evaporation of the reaction medium by pouring the reaction mixture into a nonsolvent for the polyamide product such as acetone, etc. A preferred embodiment of the invention employs the salt form of the norcamphanedicarboxylic acid and the diamine. For example, the purified salt of norcamphane-2,5-dicarboxylic acid and cyclohexane-1,4-dimethylamine is placed in an autoclave with 10–25 percent of water, the autoclave is purged with nitrogen, closed, and heated at 210°–280° C. for several hours. A low molecular weight polyamide is obtained which can be built up to a high viscosity by further heating at atmospheric pressure or under vacuum. In some cases it is desirable to add a chain terminator or viscosity stabilizer such as acetic or benzoic acid to limit the inherent viscosity of the polyamide to about 1.0. Polyamides with viscosities in the range of 0.75 to 1.25 can be more satisfactorily processed into films, fibers, sheets and molded objects.

Suitable diamines for carrying out the invention include ethylene diamine, trimethylene diamine, 1,2-diaminopropane, hexamethylene diamine, undecamethylene diamine, 1,4-cyclohexanediamine, cyclohexane-1,4-dimethylamine, o-, p-, and m-phenylene diamines, toluenediamines such as 2,3-toluenediamine, 2,4-toluenediamine, 2,6-toluenediamine, etc., and the like diamines. Suitable dicarboxylic acids for replacing part of the norcamphanedicarboxylic acid include dimethylmalonic acid, succinic acid, adipic acid, 3-methyladipic acid, pimelic acid, sebacic acid, isosebacic acid, decanedioic acid, dodecane-1,12-dioic acid, terephthalic acid, isophthalic acid, trans-1,4-cyclohexanedicarboxylic acid, and the like. The salts of any of the above diamines with any of the dicarboxylic acids can also be employed in the process of the invention for making the polyamides.

The following examples will serve to illustrate the manner of practicing our invention.

*Example 1*

This example illustrates the preparation of norcamphane-2,5-dicarboxylic acid and norcamphane-2,6-dicarboxylic acid. The reaction takes place as follows:

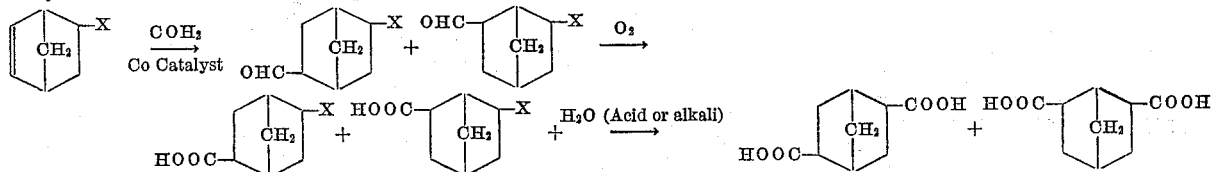

wherein X represents a —CN group or a —COOCH₃ group.

(A) 476 grams (4.0 moles) bicyclo[2.2.1]hept-5-ene-2-carbonitrile were dissolved in 2000 ml. of dry benzene and 30 grams of cobalt carbonyl was added as a catalyst. The material was placed in an autoclave, the system was purged with nitrogen, then hydrogen was introduced to a pressure of 800 p.s.i. The vessel was then charged to 2000 p.s.i. with CO+H₂, heated to 140° C. and CO and H₂ added at 3000 p.s.i. until the reaction leveled off. The resulting product was transferred to a flask, solvent removed under partial vacuum, and the cyanoaldehyde rapidly flashed over under as low a pressure as possible. Redistillation of this crude product using a suitable column yielded a clear, colorless oil, B.P.=131°/4.5 mm. —$n_D^{20}$=1.4947, yield=329 grams, 57% of theory of the compound of the above structure.

149 grams (1.0 mole) of the mixture of 2-cyanonorcamphane-5 and 6-carboxyaldehydes prepared as above were mixed with 500 ml. of ethylene dichloride, and a solution of 55 grams (1.2 mole) of NO₂ dissolved in 100 ml. ethylene dichloride was added slowly over a period of several hours keeping the reaction mixture at room temperature. The resulting solution was allowed to stand overnight. Air was blown through the solution until all the oxides of nitrogen were removed, the solvent was removed by evaporation on the steam bath and the residual oil was taken up in ethyl acetate and extracted with aqueous sodium bicarbonate. This solution was acidified with dilute nitric acid and the solution extracted with ethyl acetate to remove the acidic fraction. After washing with several small portions of water, the solvent was removed under partial vacuum and the residual oil, a mixture of 2-cyanonorcamphane-5(and 6)-carboxylic acids, obtained in 82% yield, was subjected to hydrolysis using excess aqueous 10% NaOH. The hydrolysis was accomplished by refluxing the system until no further evolution of ammonia was detected, usually about three to four hours. After acidification with dilute nitric acid, a white crystalline product formed which was isolated by filtration, and recrystallized from hot water. The yield was 76 grams, M.P. 278.5–279.5, neut. eq.=90.7 (theoretical neut. eq.=92), percent C 58.03 (theory 58.75), percent H 6.61 (theory 6.53). Since this acid had a relatively high melting point, it is presumed to be the norcamphane-2,5-dicarboxylic acid. The aqueous filtrate was extracted with ethyl acetate and from this solvent was isolated 212 grams of an oil, which solidified on standing. This compound, presumably norcamphane-2,6-dicarboxylic acid, was recrystallized from water, M.P. 187–189° C., neut. eq. 92 (theory 92).

(B) A solution of 4 moles (608 grams) of bicyclo-(2.2.1)-hept-5-ene-2-carboxylic acid, methyl ester in 2 liters of benzene is reacted with 20 grams cobalt carbonyl according to the procedure outlined in Example 1. A yield of 325 grams of crude Oxo product boiling at 115–118°/4.5 mm. was obtained. This was re-distilled through a 1½″ x 60″ column packed with Podbelniak Helipak. The product obtained in 69% yield was a mixture of 5- and 6-formylnorcamphane-2-carboxylic acid, methyl ester; B.P.=105–111°/4.3 mm. $n_D^{20}$=1.4806.

|  | Theory | Found |
|---|---|---|
| Percent C | 65.9 | 65.55 |
| Percent H | 8.02 | 7.69 |

The aldehyde mixture was oxidized with air by adding 1 gram of cobalt acetate dissolved in a few ml. of water to 147 grams (1 mole) of the aldehyde and bubbling in air at 65° C. for 36 hours. The acidic fraction was extracted with sodium bicarbonate solution, decolorized with charcoal, reprecipitated as an oil with hydrochloric acid and isolated by extraction with ethyl acetate yield of crude oil 68%. This was saponified without further purification using aqueous 10% sodium hydroxide. The aqueous solution of the sodium salt of the mixture of norcamphanedicarboxylic acids was purified with Darco (a decoloring charcoal), then the acid was liberated by the addition of excess HCl. Roughly equal amounts of two isomeric norcamphanedicarboxylic acids were formed. The one acid, norcamphane-2,5-dicarboxylic acid, M.P.=278–279° C., which was fairly insoluble in water formed as crystalline needles; the other isomer, presumably the norcamphane-2,6-dicarboxylic acid, has a considerable water solubility and recrystallizes with difficulty to form platelets, M.P. 179° C.

|  | 2,5-Isomer | 2,6-Isomer | Theory |
|---|---|---|---|
| Percent C by wt | 58.04 | 58.28 | 58.75 |
| Percent H by wt | 6.59 | 6.68 | 6.53 |
| Neut. eq | 91.73 | 91.6 | 92 |

In the above process of (A) and (B) starting materials, bicyclo(2.2.1)hept-5-ene-2-carbonitrile and methyl bicyclo(2.2.1)hept-5-ene-2-carboxylate are prepared by known methods from cyclopentadiene and acrylonitrile or methyl acrylate. The Oxo reaction is carried out under pressure using benzene as a solvent but the other known solvents for this reaction could be used. A temperature range of 130–150° C., preferably 140° C. is suitable. Cobalt carbonyl is used as a catalyst. The amount of catalyst used is 0.1 to 10%, preferably 1–5%, based on the olefin. The products are the corresponding aldehydes together with a small amount of the substituted norcamphane methanol which results from the fact that some reduction of the aldehyde products occurs. Two isomeric aldehydes result in each reaction. Oxidation of products of the Oxo reaction is accomplished with nitrogen dioxide at room temperature using a suitable solvent such as carbon tetrachloride or ethylene dichloride. Alternatively the aldehydes obtained by this process may be oxidized with air at 60–70° C. using cobalt acetate as a catalyst. The acidic fraction obtained is isolated by the usual methods and is then subjected to hydrolysis using excess 10% aqueous NaOH solution to yield the desired norcamphanedicarboxylic acids.

*Example 2*

A mixture of 3.68 g. (0.02 mole) of norcamphane-2,6-dicarboxylic acid, 3.14 g. of a 74% water solution of hexamethylenediamine (0.02 mole), and 5 ml. of mixed m- and p-cresols were heated at 200° C. in an atmosphere of nitrogen until the excess water was driven off and a clear solution was obtained. The cresol solution was then heated at 220° C. for one hour and finally at 235° C. for two hours. The polymer was isolated by pouring the solution into acetone. The resulting polyamide was white in color and had an inherent viscosity of 0.53. It had a melting point range of 183–197° C. The inherent viscosity was measured in a solvent consisting of 60 parts phenol and 40 parts tetrachloroethane. The crystalline melting point was determined under crossed nicols on the hot stage of a microscope. The polyamide in this example can be molded by melt-extrusion into molded objects having high impact and tensile strength. The heat distortion temperature is also high due to the crystalline nature of the polymer.

Example 3

A homopolymer was prepared from norcamphane-2,5-dicarboxylic acid and p-xylene-α,α'-diamine by the method described in Example 2. The polymer had a melting-point range of 236–251° C. This polyamide can also be used in the manufacture of molded articles. It is especially valuable in the production of film and fibers. The fibers have a high-softening point and excellent dyeability.

Example 4

A stainless steel autoclave was charged with 250 g. of the salt of norcamphane-2,5-dicarboxylic acid and cyclohexane-1, 4-dimethylamine, and 30 ml. of water containing 0.01 g. acetic acid. The autoclave was purged with nitrogen three times and then further purged of air by heating to 120° C. and releasing a small amount of steam. It was then closed and heated at 250° C. for two hours. The autoclave was cooled and the resulting polyamide prepolymer was removed. It was a white, opaque solid. The prepolymer was vacuum dried at 70° C. to remove the excess water. After drying, it was pulverized to a particle size of 0.01 to 0.03 inch. The pulverized prepolymer was then heated in a flask with stirring under a vacuum of 0.1 mm. for three hours at 225° C. The resulting polyamide had an inherent viscosity of 0.95 and a crystalline melting point of 257–267° C. This polyamide could be melt-spun into fibers which could be drawn and heat-set easily. The fibers exhibited a high degree of crystallinity and were very strong and elastic. They dyed to deep shades with acetate, premetalized, and acid wool dyes. The polymer could also be melt-extruded into film and molded objects.

Example 5

A copolyamide was prepared according to the procedure outlined in Example 4. A ratio of 3 moles norcamphane-2,5-dicarboxylic acid, 2 moles trans-cyclohexane-1,4-dicarboxylic acid, and 5 moles cyclohexane-1,4-dimethylamine was used. A high-viscosity polymer with a microcrystalline melting point 274–286° C. was obtained. This copolyamide is particularly valuable in the manufacture of fibers having a high-softening point.

Example 6

A homopolymer of norcamphane-2,6-dicarboxylic acid and m-xylene-α,α'-diamine was prepared according to the method used in Example 2. The polymer had a melting-point range of 196–210° C. This polyamide is useful in the manufacture of molded articles and sheets.

Example 7

A copolyamide was prepared from a ratio of 0.80 mole norcamphane-2,5-dicarboxylic acid, 0.20 mole terephthalic acid, and 1.0 mole m-xylene-α,α'-diamine. A mixture of 10 g. of the two salts in the above molar proportion and 0.5 ml. water was heated in an evacuated, sealed tube at 250° C. for two hours. The prepolymer was further polymerized by heating in an atmosphere of nitrogent at 275° C. for one hour. A viscous, colorless melt was obtained from which strong, elastic fibers could be drawn. The copolyamide had a melting-point range of 253–267° C. Fibers of the polymer dye heavily with acetate, premetalized, and acid wool dyes. The polymer is also useful in the manufacture of film by melt extrusion or by casting from a solvent such as acetic acid.

By following the procedures of the above examples, other polyamides and copolyamides may be prepared from the norcamphane-dicarboxylic acids of the invention and any of the mentioned diamines and other dicarboxylic acids that are suitable for replacing part of the norcamphanedicarboxylic acids. The products have generally similar properties as those of the examples. All of the products are soluble in one or more volatile solvents including formic acid, acetic acid, dimethylformamide and butyrolacetone, which solutions can be spun into strong fibers or coated into clear flexible sheets and films. The latter products are useful among other things for photographic film supports. The products of the invention are thermoplastic and on melting give homogeneous clear dopes which can be readily converted by melt-spinning to fibers or injection molded into shaped articles. If desired, various fillers, pigments, dyes, lubricants, plasticizers, etc. can be incorporated into the polyamide products of the invention.

The invention has been described in detail with particular reference to preferred embodiments thereof, but it will be understood that variations and modifications can be effected within the spirit and scope of the invention as described hereinabove and as defined in the appended claims.

What we claim is:

1. A resinous polyamide of equimolar proportions of a norcamphanedicarboxylic acid selected from the group consisting of norcamphane-2,5-dicarboxylic acid and norcamphane-2,6-dicarboxylic acid and a diamine represented by the following general formula:

$$H_2N-R-NH_2$$

wherein R represents a member selected from the group consisting of a divalent alkylene group of 2–11 carbon atoms, a phenylene group, a tolylene group, a

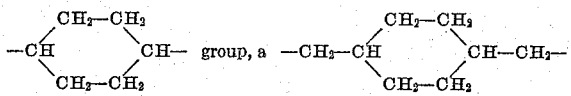

group and a

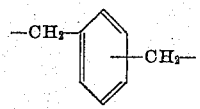

group.

2. A resinous polyamide of equimolar proportions of norcamphane-2,6-dicarboxylic acid and hexamethylenediamine.

3. A resinous polyamide of equimolar proportions of norcamphane-2,5-dicarboxylic acid and hexamethylenediamine.

4. A resinous polyamide of equimolar proportions of norcamphane-2,5-dicarboxylic acid and p-xylene-α,α'-diamine.

5. A resinous polyamide of equimolar proportions of norcamphane-2,6-dicarboxylic acid and p-xylene-α,α'-diamine.

6. A resinous polyamide of equimolar proportions of norcamphane-2,5-dicarboxylic acid and cyclohexane-1,4-dimethylamine.

7. A resinous polyamide of equimolar proportions of norcamphane-2,6-dicarboxylic acid and cyclohexane-1,4-dimethylamine.

8. A resinous polyamide of equimolar proportions of norcamphane-2,5-dicarboxylic acid and m-xylene-α,α'-diamine.

9. A resinous polyamide of equimolar proportions of norcamphane-2,6-dicarboxylic acid and m-xylene-α,α'-diamine.

10. A resinous copolyamide of norcamphane-2,5-dicarboxylic acid and cyclohexane-1,4-dimethylamine wherein from 10–50 mole percent of the said dicarboxylic acid is replaced with transcyclohexane-1,4-dicarboxylic acid, the total moles of said dicarboxylic acids being equal to the moles of said cyclohexane-1,4-dimethylamine.

11. A resinous copolyamide of norcamphane-2,5-dicarboxylic acid and m-xylene-α,α'-diamine wherein from 10–50 mole percent of the said dicarboxylic acid is replaced with terephthalic acid, the total moles of said dicarboxylic acids being equal to the moles of said m-xylene-α,α'-diamine.

References Cited in the file of this patent

UNITED STATES PATENTS

| | | |
|---|---|---|
| 2,836,579 | Schweitzer | May 27, 1958 |
| 2,846,467 | Wiese | Aug. 5, 1958 |
| 2,848,485 | Cohen | Aug. 19, 1958 |
| 2,859,208 | Hollyday | Nov. 4, 1958 |